Dec. 18, 1962     H. A. SKOVMAND ETAL     3,069,659
DATA PROCESSING SYSTEM

Filed April 11, 1960     9 Sheets-Sheet 1

*INVENTORS.*
HARRY A. SKOVMAND
KENNETH R. SKOVMAND
BY
*FRASER and BOGUCKI*

ATTORNEYS

Dec. 18, 1962  H. A. SKOVMAND ETAL  3,069,659
DATA PROCESSING SYSTEM
Filed April 11, 1960  9 Sheets-Sheet 4

*INVENTORS.*
HARRY A. SKOVMAND
KENNETH R. SKOVMAND
BY

*FRASER and BOGUCKI*
ATTORNEYS

Dec. 18, 1962    H. A. SKOVMAND ETAL    3,069,659
DATA PROCESSING SYSTEM
Filed April 11, 1960      9 Sheets-Sheet 7

INVENTORS
HARRY A. SKOVMAND
BY KENNETH R. SKOVMAND

FRASER and BOGUCKI
ATTORNEYS

INVENTORS.
HARRY A. SKOVMAND
KENNETH R. SKOVMAND
BY
FRASER and BOGUCKI
ATTORNEYS

United States Patent Office 3,069,659
Patented Dec. 18, 1962

3,069,659
DATA PROCESSING SYSTEM
Harry A. Skovmand and Kenneth R. Skovmand, San Jose, Calif., assignors to International Business Machines Corporation, New York, N.Y., a corporation of New York
Filed Apr. 11, 1960, Ser. No. 33,875
17 Claims. (Cl. 340—172.5)

This invention relates to systems for storing, processing and transferring data, and more particularly to systems which utilize a cyclic recording device in performing data processing functions.

The principal functional units which are used in the operation of modern data processing systems and computers include, as is well recognized, input, output, storage, arithmetic and control units. While the control functions performed in different machines can vary widely, the control functions are usually considered to be directed to the internal activities by which operating sequences and sub-sequences are selected and carried out in orderly fashion. Thus the selection of instructions, and the manipulation of internally stored data in accordance with the instructions, are important parts of the control function.

A number of data processing systems which are currently in widespread use employ multi-track cyclic recording devices as principal operative elements for performing the control function. Instructions and data may be stored on the recording device, and reproduced and rearranged in accordance with the needs of a program. These systems are required to select track locations on the cyclic recording devices by choosing particular recording tracks as well as specific unit or character positions along the tracks. A particularly advantageous form of system for selecting character positions on a cyclic recording device employs counters which are set in different count relationships and advanced with successive character positions. The counters may be set in such a manner as to have zero counts at the point at which recording or reproducing is started, and a predetermined final count when the needed number of character positions have been passed. With such systems relatively little equipment is needed for the selection of a sequence of character positions. Heretofore, however, the counters have had to be advanced with respect to a fixed reference point on the cyclic recording device. Each time access is sought to the recording device in such arrangements, it is necessary to use a separate cycle of the recording device, in order to begin with the fixed reference point. In consequence, where the steps of a program call for repeated access to the cyclic recording device, as for the transfer of data between different tracks, the operation of the system as a whole may have to be delayed until a number of successive revolutions of the recording device are completed. It is evident that an increase in the speed of these data transfer operations contributes directly to system capability and is highly desirable.

An example of a system which uses a cyclic recording device for performing internal control functions is provided in a copending application for patent entitled "Data Transfer Apparatus," filed by John H. Haanstra et al., Serial No. 565,293, on January 24, 1956. The system described therein provides "in-line" data processing by handling technical business transactions sequentially as they occur and reflecting each transaction concurrently in all accounts which it affects. A large capacity randomly addressed memory is utilized in a manner such that entered data is processed along with selected data from storage. A combination of a stored program and wired program is used whereby data transfer is under the control of the stored program and decisions are made by wired program. These and other features, for full understanding of which reference should be made to the above identified application, permit in-line processing of a continuous flow of a large amount of data, and a great deal of flexibility in processing, rearranging and maintaining data. A cyclic recording device, specifically a magnetic drum, is employed as a "process" drum to store and transfer data and instructions used in the arithmetic and other processing operations. The process drum requires, as described therein, at least three cycles or revolutions for completion of the normal transfer operation, in which an instruction calls for the transfer of data from one track to another. Other parts of the system may therefore have to "wait" during transfer operations, until the transfer operations are completed.

It is therefore an object of the present invention to provide a novel data processing system.

Another object of the present invention is to provide an improved system for transferring data on a cyclic recording device.

Yet another object of the present invention is to provide an improved systems for addressing a cyclic recording device with a counter which is cycled in different count relationships with the recording device.

A further object of the present invention is to provide an improved system for performing control functions in an in-line data processing system at a higher speed than has heretofore been feasible.

In accordance with the present invention, increased speed may be given to systems which use cyclic recording devices which are addressed by counters set in different count relationships to the cyclic recording device. Instead of waiting to commence each subsequence in a program with the start of a cycle of the recording device, two or more subsequences may be carried out in succession during the same cycle of the recording device.

One specific system, given by way of example, employs a magnetic drum on which instructions and data are recorded for use in and control of an in-line data processing system. In operations in which data is transferred from one track to another on the drum, the addresses from which the data is taken and to which it is transferred are established by counters which are advanced controllably as the drum rotates. The counters are set with a given initial count, but are to provide a carry at the beginning of an address location, and to thereafter provide counts corresponding to the number of characters being transferred. In accordance with the invention, however, the counters are not advanced beginning with the reference marks on the drum but instead are advanced with variable times which are initiated with the start of the subsequences in which the counters are to be used. After the counters are initially set the counts which they present are corrected to compensate for the time relationship of the setting to the cycling of the magnetic drum. Due allowance is made for the time needed for the correction. Thus several program subsequences may follow each other within the time interval of one drum revolution if the data to be used in the transfer is stored in successive positions on the drum.

A better understanding of the invention may be had by reference to the following description, taken in conjunction with the accompanying drawings, in which.

Figure 1:
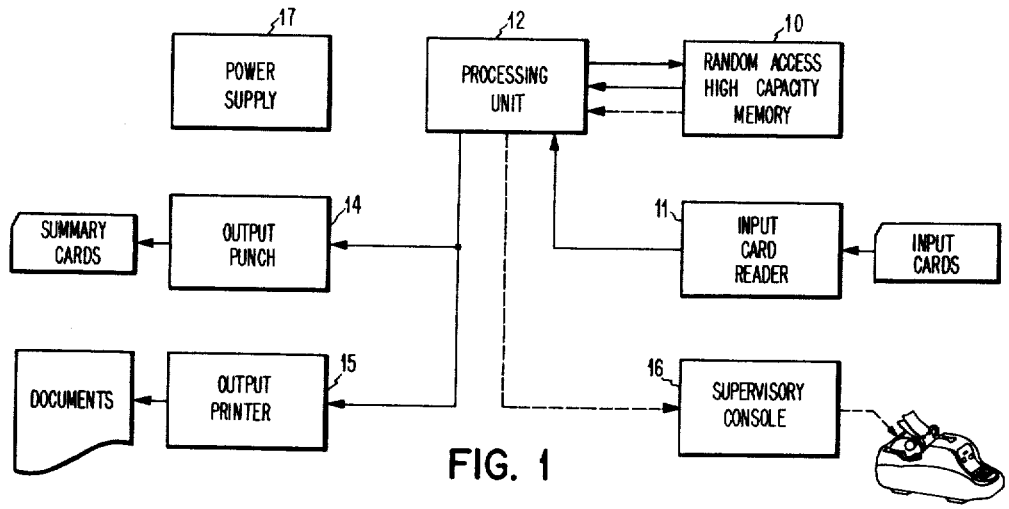
FIG. 1 is a simplified block diagram of the principal units of a system in which the present invention may be employed.

Referring now to FIG. 1, there is provided a diagram of the principal parts of an in-line data transfer system of the type described in the above identified application for patent filed by Haanstra et al. Data pertaining to a great many different accounts is maintained in a random access, high capacity memory 10, which is preferably of the type using a number of magnetic surfaced discs rotating on a common shaft and employing movable transducers which are positioned selectively at desired tracks on individual discs. Input information for the system may be derived from punched cards by an input card reader 11 containing card feeding and sensing equipment and associated circuitry. The major control functions necessary to the manipulation and storage of data are provided principally by a processing unit 12, the term "processing" here being used to conform to the like designation of a part of the system in the above identified application. The processing unit 12 provides the necessary synchronization and rearrangement of data, as well as the arithmetic and program control operations for the system.

Subsequent to the accomplishment of desired routines, data signals from the memory 10 and the processing unit 12 may be used to actuate an output punch 14 or an output printer 15. Data pertinent to the current state of any of the stored entries and other significant relationships may also be provided on command at a supervisory console 16. All of the units are coupled to and derive power from a power supply 17.

The many operative features of an in-line data transfer system thus generally arranged cannot adequately be summarized in a satisfactory brief form, and reference should be made to the copending application for an appreciation of such features. The present invention, however, is concerned with the processing unit 12, and with like units in different systems. A more detailed, but still general block diagram of parts of the processing unit 12 is provided in FIG. 2, to which reference now may be made. It must be stated that those portions which are not pertinent or necessary to a description of the present invention have been omitted for clarity and simplicity. Thus, the arithmetic units, the circuits by which the flow of input and output data is controlled and the decision elements by which program steps are chosen have not been shown.

Figure 3:
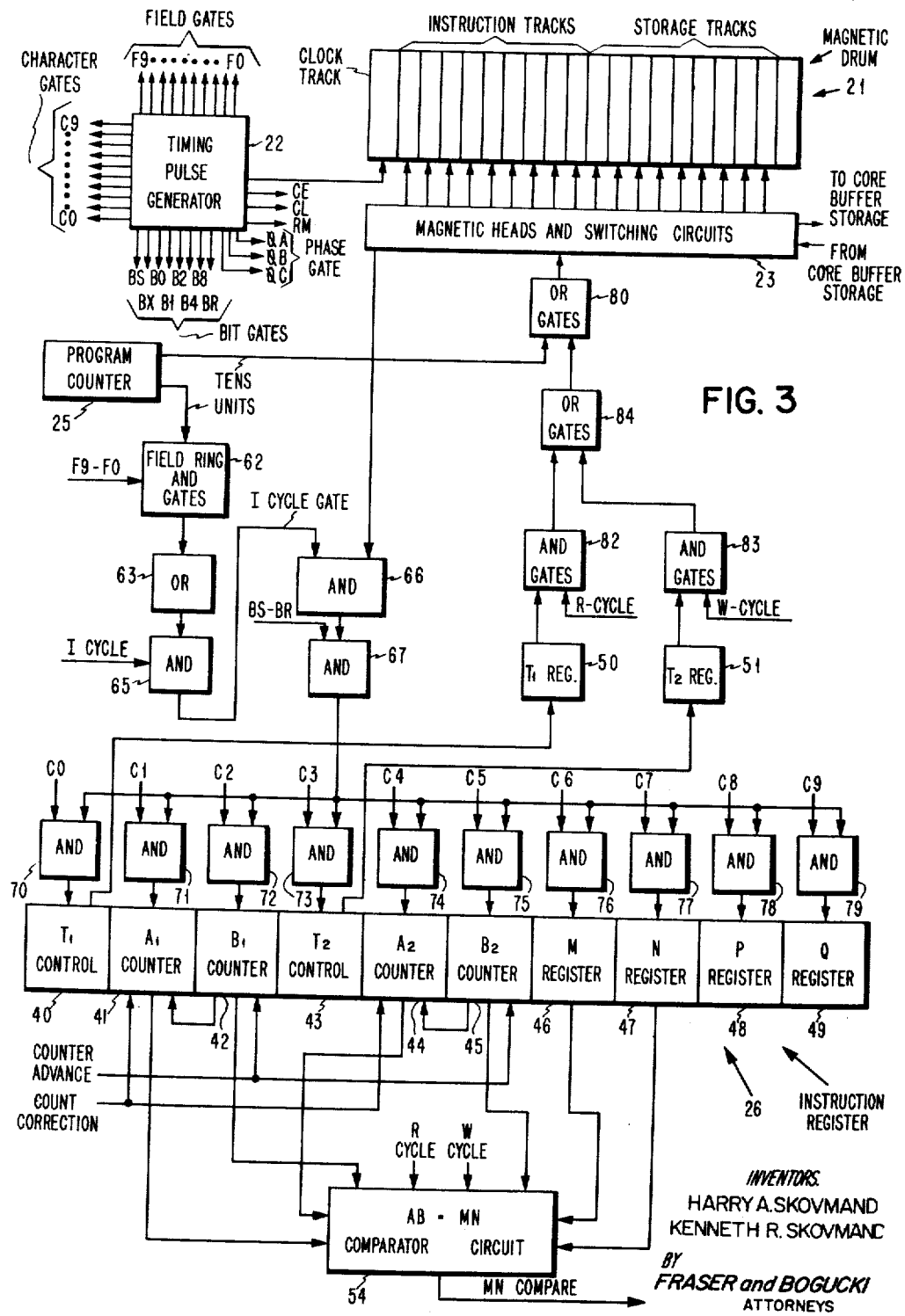
FIG. 3 is a block diagram of the cyclic recording system of FIG. 2 utilizing a process drum and other elements.

The cyclic recording system 20 includes a rotating magnetic surfaced process drum 21 with which is operatively associated a timing pulse generator circuit 22 and magnetic heads and switching circuits 23. A program counter 25 and an instruction register 26 are coupled to provide control of the operation of the magnetic heads and switching circuits 23. The detailed arrangement of these elements and the gating circuits which couple them is shown in FIG. 3, described below. Data derived from the process drum 21 during various subsequences is applied along with instructions from the register 26 to comparator and core buffer storage circuits 30 which, for present purposes, are used to establish the number of character positions to be transferred and also are used to buffer the flow of data which is being transferred. Gating circuits 32 for the control of subsequences and count correction circuits 34 for performing certain adjustments in order to assist in the achievement of high processing speeds are coupled in an integrated fashion to the cyclic recording system 20 and the comparator and core buffer storage circuits 30. For simplicity of representation, the numerous couplings between the different units, including many lines in parallel, have been shown symbolically by only a few lines. Each of the blocks is identified as to the more detailed figure in the drawings to which it is equivalent.

Figure 2:
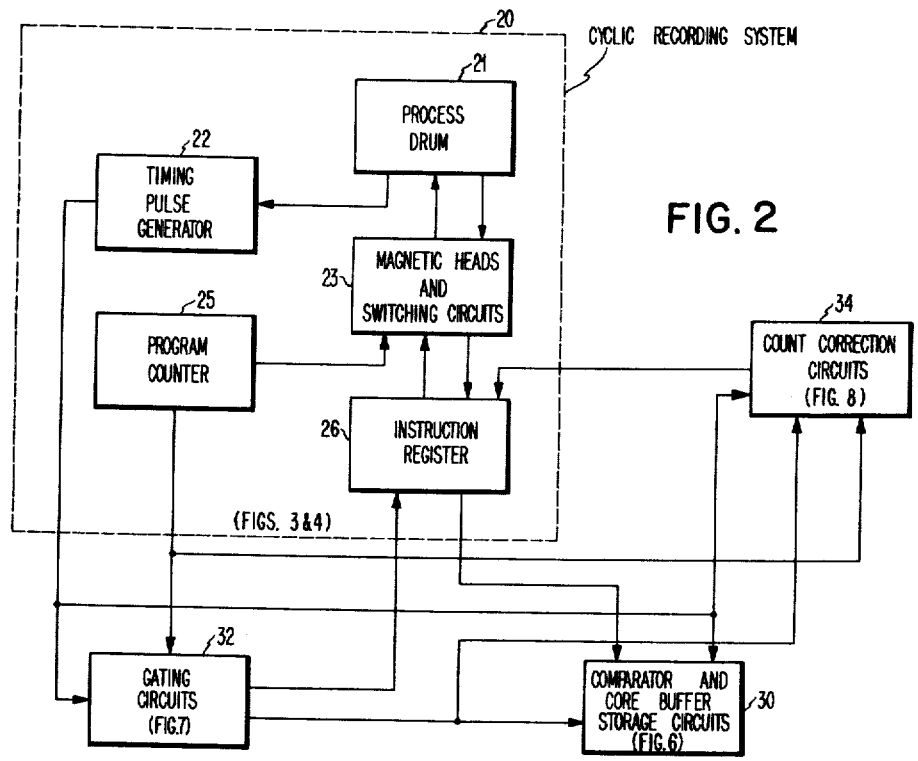
FIG. 2 is a block diagram of circuits for performing control functions in accordance with the present invention in a manner to increase the processing speed of the arrangement of FIG. 1, which circuits include a cyclic recording system, core buffer storage circuits, gating circuits and count correction circuits.

The processing unit of FIG. 2 performs some subsequences which are known as data transfers. In these subsequences a given amount of data is transferred from one track on the drum to another, from one specified address to another specified address. The individual steps of the subsequences are known as, and hereafter referred to as, the Instruction Cycle, The Read (or From) Cycle and the Write (or To) Cycle. As used in this sense, the term "Cycle" should not be confused with the full rotational cycle or revolution of the process drum 21, because a principal purpose of this invention is to make possible the completion of more than one of the Instruction, Read and Write Cycles in a single revolution of the drum 21. In the Instruction Cycle, the program counter 25 sets the switching circuits 23 to derive an instruction in a given format from a program track on the drum 21. The instruction is placed in the instruction register 26, which was cleared at the completion of the previous instruction. The instruction then controls reading of the desired data and placement of the data in the core buffer storage circuits 30 during the Read Cycle, and transfer of the data to a selected drum 21 location during the Write Cycle. Such data transfers may have to be accomplished repetitively many times, and may appreciably slow down the system in some instances if each data transfer requires three drum revolutions to complete.

Some details of the arrangement of the various tracks on the drum 21 may be discussed with reference to the drum 21 alone in FIG. 3. The drum 21 contains a clock track having a regular pattern of reference marks which provide timing pulses suitable for the generation of a number of timing signals in a manner to be discussed below. The transducers which are operatively associated with the clock track, and the various other tracks, are indicated only symbolically by arrows. The drum 21 also contains a group of instruction tracks and another group of storage tracks, as illustrated in FIG. 3. For simplicity, accumulator tracks for arithmetic and other steps, and a number of tracks which are employed for miscellaneous operations but which do not concern the present description, have been omitted.

The manner in which instructions are coded in the present system is depicted in the designations used for the various elements employed in the instruction register 26 of FIG. 3. Each unit of the instruction register 26 is designated so as to correspond to a different character in the instruction, and these designations provide convenient reference terms for following the operation of the system. Each instruction consists of a series of ten binary coded decimal characters which are recorded on the process drum 21 in sequence and entered into the instruction register 26 in sequence. The first three units of the register 26 are devoted to the characters which determine the address from which data is to be transferred, with a $T_1$ control circuit 40 being used for the character which designates the address of the storage track on the drum 21 from which data is to be taken. The address of the character position on the track is denoted in binary coded decimal form by an $A_1$ counter 41 and a $B_1$ counter 42, Each track has one hundred character positions, so that two decimal stages, such as the $A_1$ and $B_1$ counters 41 and 42, can present any count up to one hundred and can choose any of the character positions. The $B_1$ counter 42 presents the units value and the $A_1$ counter 41 presents the tens value for a given character position along the recording track.

The next three elements of the instruction register 26 consist of a $T_2$ control 43, for the character which designates the track at which data is to be inserted during a data transfer operation, an $A_2$ counter 44 and a $B_2$ counter 45. The $A_2$, $B_2$ counters 44 and 45 present the tens and units values, respectively, of the character position at which recording is to begin. Only the initial character positions of the data locations are specified by the $A_1$, $B_1$ and $A_2$, $B_2$ counters, with the total number of characters which are to be transferred being specified by an M register 46 and an N register 47. The various counters 41, 42, 44 and 45 have inputs to which counter advance pulses may be applied. The carry outputs of the $B_1$ and $B_2$ counters 42 and 45 are coupled to the advance inputs of the $A_1$ and $A_2$ counters 41 and 44 respectively.

The N register 47 represents the units position of the M–N counter, while the M register 46 represents the tens position. There being no more than one hundred characters in a track, no more than one hundred characters can be transferred from one track to another and two decimal stages are sufficient. Additional instructions may be recorded in a P register 48 and a Q register 49 which provide the remaining elements of the instruction register 26. The P and Q registers 48 and 49 are not employed during data transfer operations, and have been shown solely to complete the instruction register 6. In practice, the instructions are derived from the drum in a sequence which begins with the Q character and proceeds through to the $T_1$ character.

The cyclic recording system of FIGS. 2 and 3 also includes a $T_1$ register 50 and a $T_2$ register 51 which are governed by the $T_1$ control 40 and the $T_2$ control 43, respectively, so as to present the $T_1$ and $T_2$ characters to the switching circuits 23. Here it is assumed, for simplicity, that there are only ten storage tracks on the process drum 21. Each of the $T_1$ and $T_2$ registers 50 and 51 therefore need only have a single decimal stage, as shown in the present example. It should be understood, however, that although only single lines are shown, the binary digits of the characters are presented from the various elements of the instruction register 26 and the $T_1$ and $T_2$ registers 50 and 51 in parallel. Likewise suitable means are provided for clearing the instruction register upon completion of the instruction.

Instructions are distributed on the process drum 21 in ten separate "fields" for each instruction track. Reference may also be made, at this point, to the representation of the drum 21 which is given in FIG. 4. The ten fields, numbered from 0 to 9, are disposed sequentially around each instruction track. The direction of rotation of the drum 21, however, is such that a given fixed magnetic head is passed first by field 9, then by field 8, then by field 7, and so on. Individual ones of the instruction tracks are selected under control of the tens stage of the program counter 25, while the field desired within a track is selected under control of the units stage of the program counter 25. As with the storage tracks, there are assumed to be only ten instruction tracks, so that no further stages of the program counter 25 need be employed, for purposes of the present description. The switching circuits 23 are controlled in accordance with the characters which are provided to select the instruction tracks or storage tracks for the reproduction or recording of data.

Each of the ten fields in an instruction track includes ten character positions, identified from C0 to C9, but passing the heads in the order from C9 to C0. C9 therefore denotes the Q character of the instruction, C8 the P character, and so on to C0 for the $T_1$ character. The program counter 25 operates, as is described in detail in the above identified application, to successively choose the stored instructions for data transfer as they are needed.

The manner in which data is maintained and disposed in the storage tracks is of significance throughout the entire operation of the system, and will not be explained in detail. A representative storage track of the process drum is shown at the right hand end of FIG. 4. In the storage track, the field separation used in the instruction tracks is not employed. Instead, the storage track is divided into one hundred character positions, numbered from 00 to 99. Because of the direction of rotation of the drum, however, the character positions pass a fixed magnetic head in the order 99, 98, 97 . . . 00. Each of the character positions, on both the storage and clock tracks, is further divided into eight separate binary digit (bit) positions as shown in the enlarged fragmentary portion. These bit positions pass a fixed magnetic head in the following sequence: BS, BX, B0, B1, B2, B4, B8 and BR. The BS digit, for data characters, may be considered to be a start digit, and the BX and B0 digits to provide field designations in a punched card code, or the like. The B1 and B8 digits provide the binary values which constitute a decimal number, and the BR digit may be considered to be a parity bit. With data characters, these digits may or may not be present, in accordance with the code employed for a particular character, but a signal is provided for each bit on the clock track. These clock track bits are then employed for the control of timing and gating throughout the system described herein, and are the bits referred to by the corresponding designations in the drawings.

Figure 4:
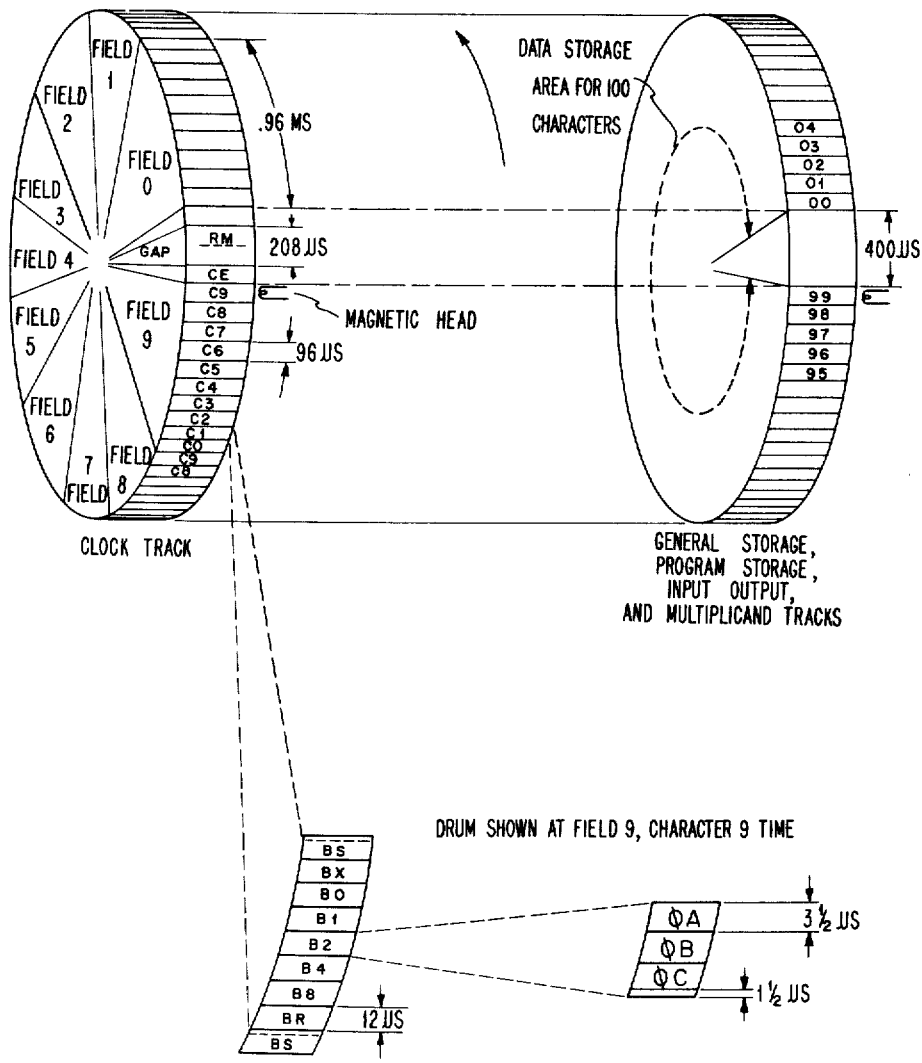
FIG. 4 is a simplified representation of the disposition and nomenclature of patterns recorded on the drum of FIG. 3.

Each bit position is further subdivided into three different phases, as shown in the final enlarged fragmentary view of FIG. 4. The three phases, termed successively $\phi A$, $\phi B$ and $\phi C$, occupy the major portion of the bit space, but a slight gap between $\phi C$ and the succeeding bit space is provided for operative reasons. For like reasons, a character position should be considered to start after the first phase of a BS bit, and to stop after the first phase of the next succeeding BS bit, instead of precisely with the start of a BS bit and the end of the next succeeding BR bit.

As is also shown in FIG. 4, on the left hand portion thereof, the clock track which is employed on the drum 21 is divided into ten fields each having ten characters like those on the instruction tracks. In addition, however, the clock track includes special spaces which are devoted to added characters which may be termed the character late (CL), reference mark (RM) and character early (CE) spaces. These positions are utilized to provide cyclical references for the operation of the system, by which separate rotations may be distinguished and operations may be synchronized to the successive revolutions of the drum. The character positions on the drum, including the special characters, may be spatially located by a permanently recorded pattern on the drum surface, or by embedded magnetic segments. The actual position of the reference mark may be assumed to be in the precise center of the reference mark space.

Figure 5A:
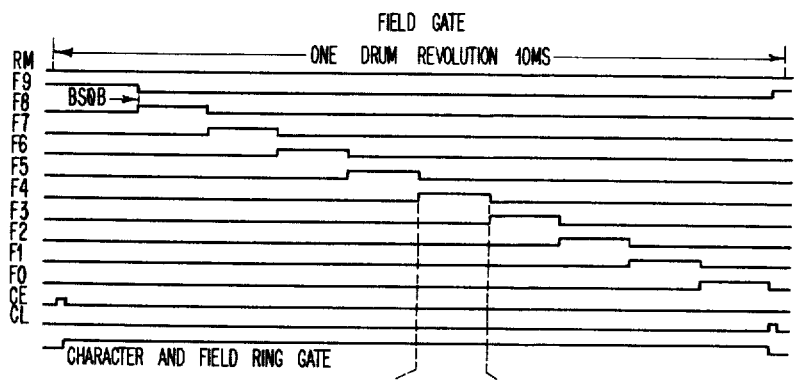
FIGS. 5A, 5B and 5C are timing diagrams showing variations with time of various signals arising in the operation of the system of FIG. 3.
Figure 5B:
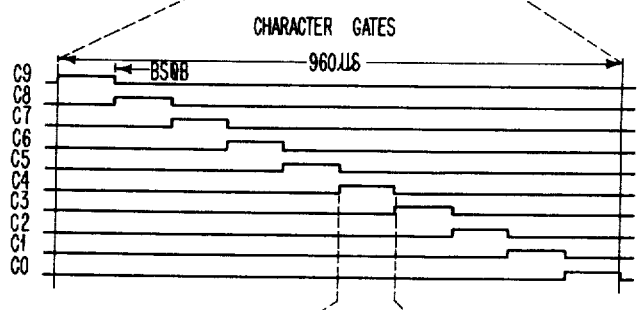
Figure 5C:
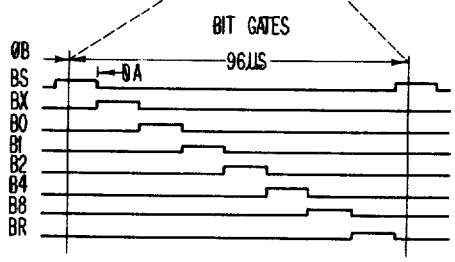

As the drum 21 rotates at a substantially fixed rate of speed, the pulses derived by a magnetic head associated with the clock track are applied to a timing pulse generator 22 (FIG. 3) which includes circuitry for providing timing signals to define the different fields, characters, bits and phases. The timing pulse generator 22 is described in the above identified application, to which reference should be made for a fuller understanding. Basically, the timing pulse generator 22 includes a number of pulse generators, each of which is synchronized with and controlled by the clock track on the magnetic drum. A number of ring counters may be employed, each controlled by the clock track signals so as to cycle in synchronism with one of the characteristic divisions of the magnetic drum. Due allowance is made for the gap provided in the successive fields because of the presence of the reference mark and the CL and CE characters. As shown in FIG. 3, one group of output signals is provided on ten different lines and represents gating signals for the different fields on the process drum 21. These successive field signals, F9 to F0, are gated out in synchronism with the passage of the successive fields past the magnetic head for the clock track on the process drum 21, as is shown in FIG. 5. As also shown in FIG. 5, gate signals C9 to C0 for the successive character positions are provided on successive ones of ten different character lines during the interval in which a field gate is provided. Like relationships hold true for the bit gates which are provided during the individual character gates, and the phase gates provided during the bit gates. The relationship of the CE, the CL and the RM gates to the various field gates, and specifically to the F9 gate signal is shown in FIG. 5A. The manner in which a character interval is defined between like intermediate points on the BS bit gate, instead of from the start of the BS bit gate, may best be seen in FIG. 5C.

FIGS. 4 and 5 also illustrate various speed and timing relationships which may be observed in a practical exemplification of a system in accordance with the invention. The process drum 21 may be rotated at a speed such that one revolution takes 10 milliseconds (ms.). With one hundred character positions, plus a reference mark position and a CE and CL position, each of the character positions, including the CL and CE positions, may be allotted a total time interval of 96 microseconds, with the RM position being allotted 208 microseconds. Each bit position thus requires 12 microseconds to pass a fixed point, and the three phase zones require approximately 3½ microseconds each, with the gap between adjacent phase zones being approximately 1½ microseconds. When these relationships are observed and the system is operated as described below, high speed operation is maintained but adequate switching and control times are assured.

A number of other signals are also used in the operation of the system. These signals are externally generated and conventionally found in such systems. Thus, Start and Stop signals may be applied to generate a Master Gate signal to govern the system. A Shared Drum Cycles signal (SDC) may also be externally provided, as by the use of a manual switch, in order to operate the system in the mode here described. A Not Clock Error signal, generated by the system when the various pulses from the timing pulse generator are properly cycled with relation to each other, is provided by the system as an added measure of safety. The Buffer Reset signal is provided to reset the counters which address the core buffer storage at the end of the field from which an instruction is taken during the Instruction Cycle, and upon detection of a selected count by the comparator circuits, as will be evident when the system is described in more detail below.

For brevity hereafter, the Instruction Cycle will be referred to as the I Cycle, the Read Cycle will be referred to as the R Cycle, and the Write Cycle will be referred to as the W Cycle. In addition, Cycle Gate signals are also employed to denote intervals within the Cycle signals during which an actual transfer of data is occurring. These Cycle Gate signals include an I Cycle Gate for the I Cycle, and an R/W Cycle Gate which is used for both the R and W Cycles.

Figure 6:
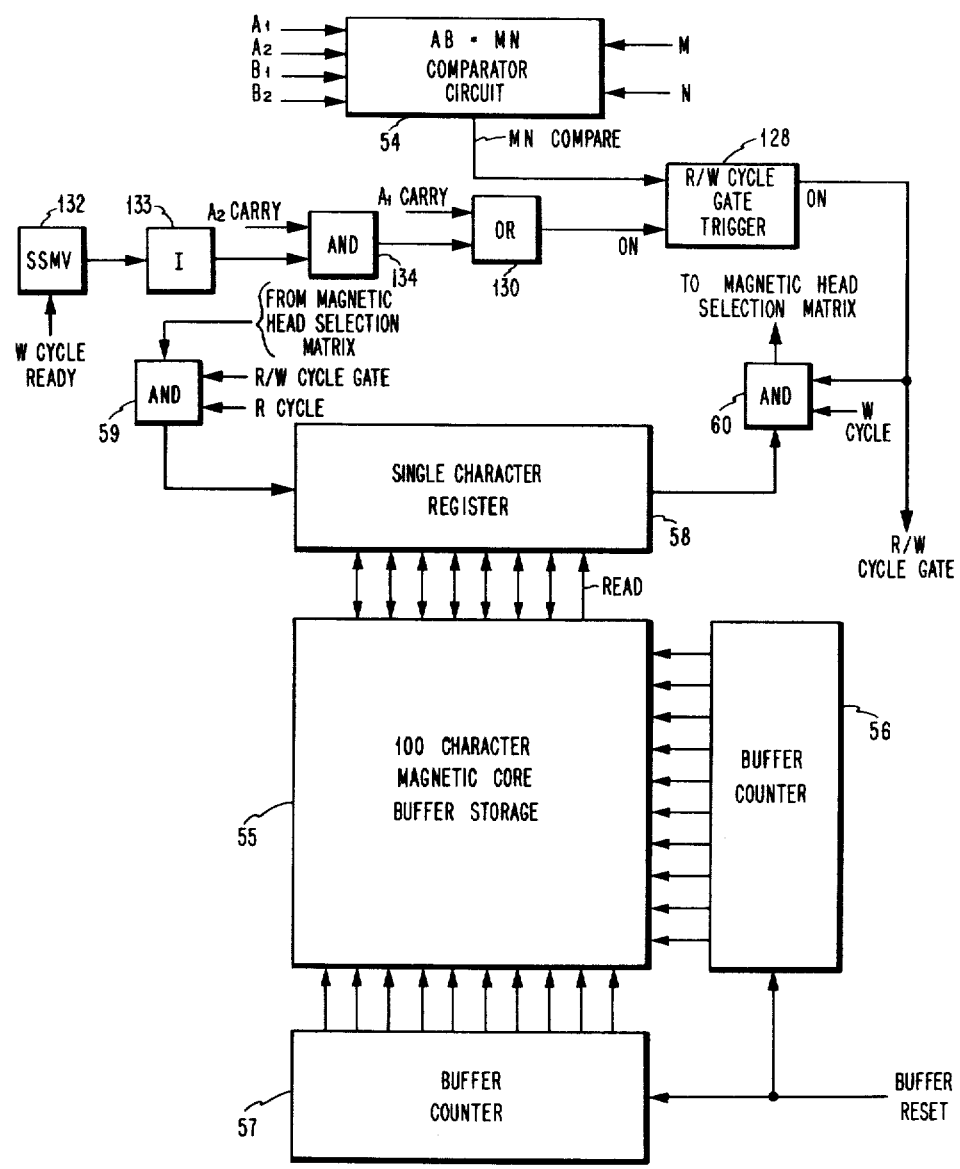
FIG. 6 is a block diagram of core buffer storage circuit arrangements which may be employed in the circuits of FIG. 2.

For data transfer operations, comparator and core buffer circuits 30, shown in detail in FIG. 6, are also employed with the cyclic recording system 20 of FIGS. 2 and 3. In the comparator and core buffer circuits of FIG. 6, as the principal units are a comparator circuit 54, referred to the AB=MN comparator, and a one hundred character magnetic core buffer storage 55 shown only in block diagram form. The buffer storage 55 is addressed by two buffer counters 56, 57 and a single character register 58. Data inputs to the character register 58 are provided sequentially during the R Cycle from the magnetic head selection matrix 23 (not shown in FIG. 6) which is coupled to the track from which data is to be taken. These data inputs are applied through an input AND gate 59 which is fully energized by coincident application of an R Cycle signal, and an R/W Cycle Gate signal, generated in a fashion described in more detail below. The buffer storage 55 has a single read winding coupled through the single character register 58 and an output AND gate 60 to the magnetic head section matrix of the process drum. The output AND gate 60 is conditioned to pass the data signals to the track at which data is to be recorded by the coincident application of a W Cycle signal and an R/W Cycle Gate signal.

Details of the operation of the core buffer circuits need only be summarized here, because reference may be made to the above identified copending application and because the operation of such devices may in any event follow conventional techniques. For simplicity also the associated circuits by which the buffer counters 56 and 57 are stepped and by which reset and readout are accomplished, have not been shown in detail. Briefly, as successive characters are taken from one track on the process drum and passed through the selection matrix and the input AND gate 59, they are applied to the single character register 58. From the single character register 58, they may be written, a line at a time, into the buffer storage 55 under the coincident control of the buffer counter 56 which is disposed in the opposite coordinate from the single character register 58. When a comparison effected by the comparator circuit 54 indicates that the desired number of characters have been transferred into the buffer storage 55, the characters may be then transferred out, onto a different track on the process drum. The counters 56, 57 are reset to a starting condition by the Buffer Reset signal.

During the W Cycle, the buffer counters 56, 57 are concurrently operated in a sequence which causes the characters to be read out in the same order in which they were written into the buffer storage 55. This readout continues at a rate synchronized with the process drum to cause proper entry into the successive character positions of the process drum. When a comparison again indicates that the desired total number of characters have been transferred, the Buffer Reset signal is again applied to reset the buffer counters 56 and 57.

The other circuits which are shown in the comparator and core buffer circuits 30 of FIG. 6 are described below in conjunction with the generation of the various cycle and gate signals.

The general organization and operation of the cyclic recording system of FIG. 2, including also the cooperation with the comparator and core buffer circuits 30 of FIG. 6, may now be discussed. The circuits by which instructions are transferred from the process drum 21 include a group of ten field ring AND gates 62 coupled to the different outputs of the units stage of the program counter 25. The field gate signals F9 to F0 are individually applied from the field ring of the timing pulse generator 22 to the different ones of the field AND gates 62, so that a gate signal for the selected field on the instruction track is provided during only the one field interval which is selected by the units stage of the program counter 25. The field AND gates 62 are coupled together at their outputs through an OR gate 63 and applied along with an I Cycle signal to another AND gate 65, output signals from which represent the I Cycle Gate signal. The I Cycle Gate signal is applied, along with the data derived from the magnetic heads and switching circuits 23, to another AND gate 66, which therefore passes the characters of the selected field on the instruction tracks. The individual bits of these characters are gated out by yet another AND gate 66, which therefore passes the characters of the selected field on the instruction tracks. The individual bits of these characters are gated out by yet another AND gate 67, by concurrent application of the bit gates BS to BR.

The gated data from the selected field on the instruction tracks is therefore provided sequentially to a group of AND gates 70 to 79 which individually control the different elements 40 to 49 of the instruction register 26. Each of the AND gates 70 to 79 is conditioned to pass data by a different one of the character gates C9 to C0 as these gate signals are provided in sequence. Thus during the first C9 character gate which is provided during a field the Q instruction is entered through the C9 AND gate 79 into the Q register 49. The sequence is continued until the $T_1$ instruction is entered through the C0 AND gate 70 during the C0 character gate signal into the $T_1$ control 40.

The selection of the desired track on the instruction track portion of the process drum 21 is, as previously described, determined by the tens stages of the program counter 25. The count presented thereby, during a particular part of the program, is applied through OR gates 80 to the magnetic heads and switching circuits 23. Although data is read out from the entire track, data passes through the AND gate 66 only during the interval in which the I Cycle Gate signal is provided.

The couplings and circuits which are employed with the drum 21 during the R and W Cycles are principally concerned with the remaining elements shown in the detailed views of FIGS. 3 and 6. The storage tracks on the process drum 21 are addressed from the $T_1$ register 50 and the $T_2$ register 51 separately during these cycles. The count presented by the $T_1$ register 50 activates one set of inputs of a group of AND gates 82 which are fully activated only during the R Cycle signal, while the $T_2$ register 51 presents a count through other AND gates 83 which are fully activated only during the presence of the W Cycle Gate. The signals appearing on the output terminals of the AND gates 82 and 83 (which have been grouped together for simplicity of representation) therefore are provided at separate points in time and are combined into a single set of outputs through a group of OR gates 84. The signals are ultimately applied to the magnetic heads and switching circuits 23 through the OR gates 80 to which the program counter 25 is also coupled. In summary, therefore, the $T_1$ register 50 controls the selection of a storage track on the process drum 21 during the R Cycle, while the $T_2$ register 51 controls the selection of a storage track on the process drum 21 during the W Cycle.

The comparator circuit 54, the $A_1B_1$ counters 41, 42 and the $A_2B_2$ counters 44, 45, however, determine the characters to be transferred from and to the selected storage tracks. Each of the counter stages 41, 42, 44 and 45 are coupled to the coparator circuit 54, along with the R Cycle signals and the W Cycle signals and the fixed counts presented by the M register 46 and the N register 47. The comparator circuit 54 has not been shown in detail, but operates in conventional fashion to make a comparison between the $A_1B_1$ counts and the MN counts during the presence of the R Cycle signal, and between the $A_2B_2$ counts and the MN counts during the presence of the W Cycle signal. An MN Compare signal is provided whenever the input counts are equal during a given cycle.

Taking the R Cycle first, the discussion at this point may center about the manner in which a sequence of characters is selected from a given track on the process drum when Shared Drum Cycles are not employed. In this situation, each of the I, R and W Cycles is allotted a full revolution of the process drum 21 and each is initiated at the reference mark (RM). During the R Cycle the $A_1B_1$ counter 41, 42 is set to have a desired count when the reference mark on the process drum 21 passes the magnetic heads. The count set into the $A_1B_1$ counter 41 corresponds in value at this time to the number of the character position from which the taking of data on a storage track is to begin. If data transfer is to begin from character position 61, for example, the $A_1B_1$ counter 41, 42 is set to 61. The $A_1B_1$ counter 41, 42 is then advanced by counter advance pulses provided during the R Cycle. The first counter advance pulse is derived for this mode of operation from the CE character position (FIG. 4) and the succeeding pulses come from the BR bit signals for each of the following character positions. As the process drum 21 rotates, however, the number of the character position scanning past the magnetic heads becomes successively lower while the value presented by the $A_1B_1$ counter 41, 42 approaches 100. Because the counter 41, 42 is advanced just before each character position passes the magnetic heads, the counter reaches the count of 100 and provides a carry pulse in the bit time just preceding the arrival of the selected character position at the magnetic heads for reading. This initiates transfer of data from the selected storage track by starting the R/W Cycle Gate signal. Referring specifically to FIG. 6, the concurrent presence of the R/W Cycle Gate signal and the R Cycle signal at the input AND gate 59 permits the successive characters from the magnetic heads to be entered into the buffer storage 55 in the manner previously described. This entry of the successive characters thereafter continues until a full transfer has been effected, as determined by the generation of the MN Compare signal.

Because the $A_1B_1$ counter 41, 42 is set to a zero count at the start of the data transfer, it effectively counts the number of characters being transferred. Therefore, the comparator circuit 54 may make a relatively simple comparison between the count presented by the $A_1B_1$ counter 41, 42 and that presented by the MN register 46, 47 to establish when the transfer should stop. With equal counts on the $A_1B_1$ counters 41, 42 and the MN register 46, 47 the MN Compare signal is provided, and the R/W Cycle Gate signal is terminated, so that entry into the buffer storage 55 is completed.

On the next passage of the reference mark on the process drum 21 past the reading heads, for the mode of operation in which drum cycles are not shared, the system then begins the W Cycle. The relationship of the count set into the $A_2B_2$ counter 44, 45, and the manner in which the count is advanced, is the same in principle as has previously been described in conjunction with the $A_1B_1$ counter 41, 42. The advance pulses are applied to the $B_2$ counter 45 of the $A_2B_2$ counter 44, 45 starting with the KM position on the drum 21. Again, the R/W Cycle Gate signal is initiated when the $A_2B_2$ counter 44, 45 reaches the count of 100 and provides the $A_2$ carry. The characters stored in the buffer storage 55 (FIG. 6) are then read out in the order in which they were written in, and directed back to the magnetic heads and switching circuits 23 for entry on the selected storage track of the process drum 21 at the desired character position. This data transfer is completed when the $A_2B_2$ counter 44, 45 presents the same count as that presented by the MN register 46, 47. This then completes the simplified example of the transfer of data from and to different storage tracks on the process drum 21 in the mode in which the I, R and W Cycles each use a single drum revolution.

Having thus described the general organization and operational sequence of such a data processing system, the individual steps by which the various Cycle signals are provided may now be reviewed. Referring specifically to the gating circuits of FIG. 7, which correspond to the gating circuits 32 of FIG. 2, and referring also to a portion of the arrangement of FIG. 6, there are shown a number of individual intercoupled gate circuits. For simplicity and clarity, all coupling lines have not been shown, but the input signals provided to the various gating elements have been enumerated. The basic circuit elements which are employed include AND, OR and trigger circuits of any of the types well known in the art. The trigger circuits, which are here assumed to be bistable multivibrators, are turned "on" by the application of pulses to a selected one of the two inputs, and accordingly the input and output terminals which are used in the "on" condition have been given like designations.

Figure 7:
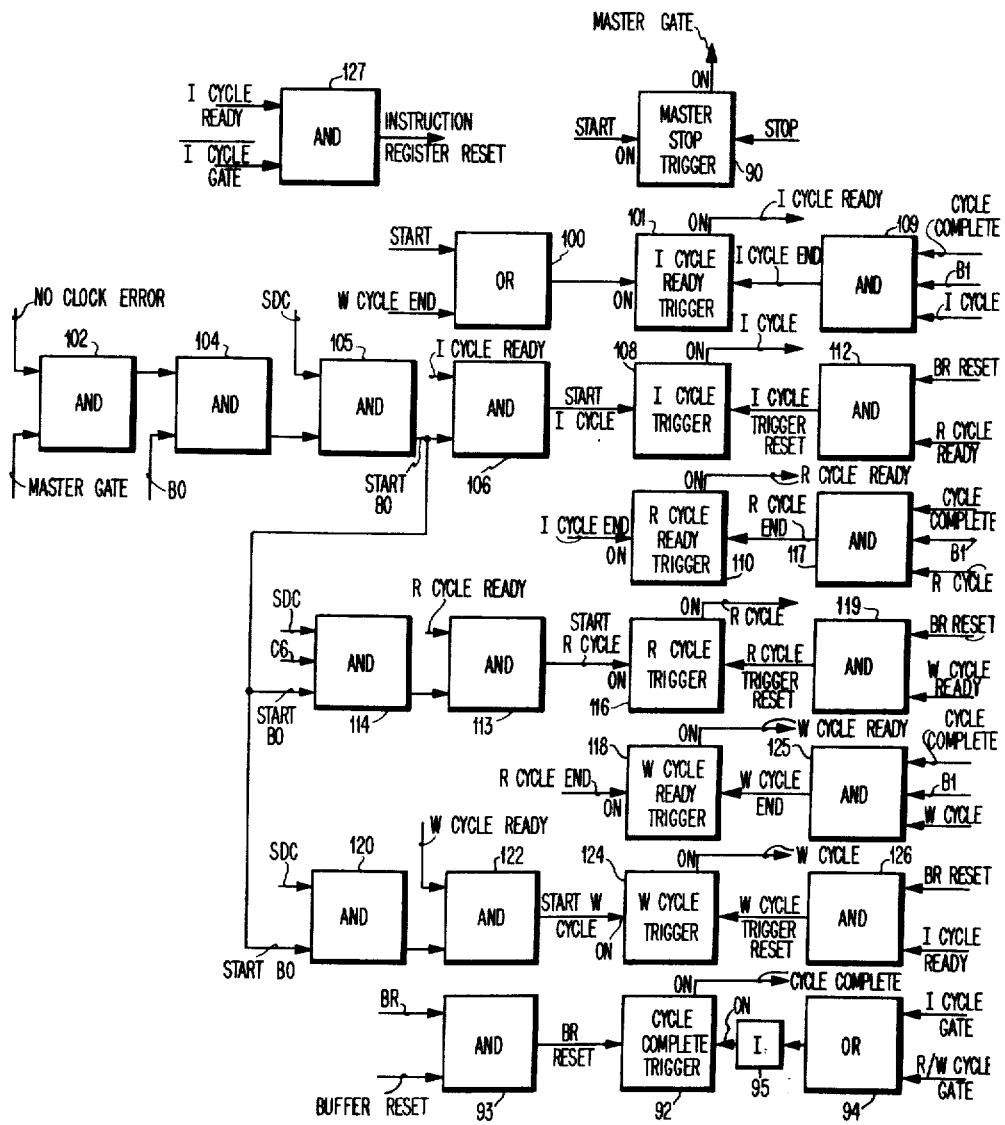
FIG. 7 is a block diagram of gating circuits employed in the arrangement of FIG. 2.

The different signals which are generated by the gating circuits of FIG. 7 in the course of the performance of a full data transfer operation include Cycle signals (the I, R and W Cycle signals), Cycle Ready signals (which may be considered to be transitional or preparatory signals for the different individual cycles) and "Cycle Gate" signals (I and R/W Cycle Gate signals), which are signals which denote the intervals in which instructions or data are transferred to or from the process drum. In addition, various cycle control and reset signals are provided in obtaining and maintaining an orderly sequence in the gating operations. The operation of the arrangement of FIG. 7 and the pertinent portions of the arrangement of FIG. 6 may thus be understood by following through the initiation and termination of the various individual signals which are generated in the course of a complete data transfer operation.

Operations are initiated at a master stop trigger 90, to one input of which start signals are applied to turn the trigger 90 "on" so as to generate a Master Gate signal. The master stop trigger 90 is turned off by stop signals, applied to its remaining input. The Master Gate signal is coupled to various control elements (not shown) throughout the system so as to insure inactivation of the system when the master stop trigger 90 is automatically or selectively turned off.

An important control function is also provided by a Cycle Complete trigger 92 which is turned on by termination of any of the I Cycle Gate or R/W Cycle Gate signals. The I and R/W Cycle Gate signals are applied through an OR circuit 94 and an inverter circuit 95 to the "on" input of the Cycle Complete trigger 92 so that the termination of the various Cycle Gate signals turns on the Cycle Complete trigger 92. Shortly thereafter, the Buffer Reset signal is provided as by the use of a delayed pulse generator responsive to the termination of the I Cycle Gate and R/W Cycle Gate to provide a signal approximately equal to a character gate in duration. Upon application of the next succeeding BR signal along with the Buffer Reset to an AND gate 93, a BR Reset signal is provided which turns off the Cycle Complete trigger 92. Each actual data transfer operation therefore terminates in generation of a Cycle Complete signal, followed by the BR Reset signal.

To prepare the gating circuits for the I Cycle operation, the start signal is applied through an OR circuit 100 to turn on an I Cycle Ready trigger 101. The I Cycle Ready trigger 101 is also turned on by W Cycle end signals from the previous data transfer, so a sequence may be intiated at some intermediate point in a drum cycle. The circuits then effectively check for various system conditions of operation. An AND circuit 102 detects the coincident presence of a "No Clock Error" signal and the Master Gate, and primes an AND gate 104 to which are also applied the BO signals. Output signals from the AND gate 104 are applied along with the SDC signals to an AND gate 105 to generate what may be considered to be Start BO signals. Finally, the signals for the start of the I Cycle are generated by an AND gate 106 which is conditioned by the I Cycle Ready signals and which receives the Start BO signals. The Start I Cycle signals turn on the I Cycle trigger 108, with the signals from the "on" output terminal of the I Cycle trigger 108 providing the I Cycle signals for the system. As was discussed above in conjunction with FIG. 3, to which brief reference may now be made, the I Cycle signals condition an AND gate 65 of FIG. 3 to which the various field gates are also applied, and the I Cycle Gate signal is generated thereby, to denote the time interval in which an instruction is to be transferred from the process drum. At the completion of this transfer, the Cycle Complete signal is generated, to initiate a sequence for turning off the various signals arising during the I Cycle. Coincident application of the Cycle Complete signal, a B1 pulse and the I Cycle signal to an AND gate 109 results in the provision of an I Cycle End signal to turn off the I Cycle Ready trigger 101. The I Cycle End signal also turns on the R Cycle Ready trigger 110 to prepare for R Cycle operation. The following BR Reset signal is then applied to an AND gate 112 which is conditioned by the R Cycle Ready signal to apply a reset signal to the I Cycle trigger 108 so as to turn that trigger off.

The R Cycle Ready signal from the trigger 110 prepares the gate circuits for the R Cycle, in which data is transferred from storage track on the drum to the buffer storage. The R Cycle Ready signal conditions one input of an AND gate 113, which in turn provides a start signal for the R Cycle upon coincident application of an SDC signal, a Start BO pulse and a C6 character gate through a coupled AND gate 114. The Start R Cycle signal turns on the R Cycle trigger 116, providing the R Cycle signal. Character gate C6 is used to initiate this cycle because of the time relationship which this character gate establishes. It is known, because of the fact that instructions are contained in different fields on the drum, that the previous instruction transfer will have been completed during character gate C0. It is further known that a predetermined amount of time must be utilized for accomplishing various switching and count correction operations to be described in more detail below. Four added character positions are allotted for this interval, these being defined by the C9, C8, C7 and C6 gates of the field following the field in which the instruction was taken off the drum.

During the R Cycle, the R/W Cycle Gate signal is generated (as discussed below in conjunction with FIG. 6), and data is transferred from the process drum to the buffer storage. On completion of this data transfer, the termination of the R/W Cycle Gate signal causes generation of the Cycle Complete signal to initiate a sequence in which the R Cycle Ready trigger 110 is turned off by the R Cycle End signal from an AND gate 117 and the R Cycle trigger 116 is then turned off by the R Cycle trigger Reset signal from the AND gate 119. The R Cycle End signal also turns on the W Cycle Ready trigger 118, preparing the system for the final, W Cycle in the data transfer operation.

In the W Cycle, data is transferred from the buffer storage back to a selected address on a selected storage track on the process drum. As with the commencement of the R Cycle, the coincidence of an SDC signal and a Start BO signal at an AND gate 120 are detected to activate a second AND gate 122 which is conditioned by the W Cycle Ready signal so as to provide a Start W Cycle signal. The Start W Cycle signal turns on the W Cycle trigger 124, with the R/W Cycle Gate signal being generated within this cycle time to control the actual transfer of data from the buffer storage back to the process drum. In terminating the W Cycle, the Cycle Complete signal, along with the coincident B1 pulse and the W Cycle signal, together activate an AND gate 125 to provide the W Cycle End signals to turn off the W Cycle Ready trigger 118. The following BR Reset signal and the I Cycle Ready signal from the trigger 101 which is activated by the W Cycle End signals, then operate an AND gate 126 which resets the W Cycle trigger 124. Thus, the W Cycle Ready trigger 118 and the W Cycle trigger 124 are both turned off and the system is again in its initial state of operation, with the W Cycle End signal being passed through the OR gate 100 to turn on the I Cycle Ready trigger 101. An instruction register reset signal is obtained from AND gate 127 by combining the I Cycle Ready signal with the not I Cycle Gate signal. The instruction register 26 is therefore cleared. Consequently, the same sequence may be repeated on successive steps to provide further data transfer operations.

The R/W Cycle Gate signal is generated by the elements shown in FIG. 6. An R/W Cycle Gate trigger 128 is arranged to be turned off by MN Compare signals from the comparator circuit 54. The trigger 128 is turned on, however, by a combination of gates which insure proper timing. $A_1$ carry signals applied through an OR circuit 130 to the on input terminal of the R/W Cycle Gate trigger 128 indicate that the transfer from the storage track of the process drum may commence. Inasmuch as the generation of the R Cycle signal is delayed sufficiently to insure proper count correction, the $A_1$ carry may be used virtually instantaneously thereafter in the generation of the R/W Cycle Gate.

With the W Cycle signals, however, a different arrangement is employed. W Cycle Ready signals are applied to a single shot multivibrator 132, the output terminal of which is coupled through an inverter 133 to an AND gate 134 to which the $A_2$ carry signals are also applied. The pulse introduced by the single shot multivibrator 132 is selected to be of sufficient duration to encompass the switching delays which are necessary following the R Cycle End signal. On the cessation of this pulse, the output of the inverter circuit 132 conditions the AND gate 134 and the $A_2$ carry signal is passed through the AND gate 134 and the OR circuit 130 to turn on the R/W Cycle Gate trigger 128. Data may then be transferred back from the buffer storage 55 to the process drum. If an $A_2$ carry signal is received prior to the completion of this delay interval, the system must wait until the next cycle. In both instances of data transfer, the MN Compare signal is used to turn off the R/W Cycle Gate trigger 128.

The problems involved in increasing processing speed may therefore be visualized in terms of the states of the various counters 41, 42, 44 and 45 of FIG. 3. The counts which determine the addresses from which stored data is to be taken and to which it is to be transferred are not set into the instruction register 26 of FIG. 3 until the Instruction Cycle. Following the entry of the instruction, the counts presented by the various counters 41, 42, 44 and 45 are those intended to be presented at the reference mark on the process drum, and not those at the position which the drum then occupies (at the completion of entry of the instruction). Because the ten character instruction may be entered in any of the ten different fields on the drum, the counts presented by the various counters stages will differ from the counts which they should have by correspondingly varying amounts.

In providing a Shared Drum Cycle mode of operation, systems in accordance with the invention correct the counters for the actual position of the instruction as rapidly as possible during and following the I Cycle. It will be recalled that, as discussed above in conjunction with FIG. 7, the R Cycle trigger 116 is turned on by coincident application of the C6 and B0 gates to the AND gate 114. Accordingly, there is an interval from some point in the I Cycle to the C6 B0 time of the following field in which the correction may be accomplished. Because the entire instruction is entered previous to the C0 character of the I Cycle Gate, five character times are available for this count correction. These character times are, specifically, C0 of the I Cycle Gate, and C9, C8, C7 and C6 of the next succeeding field.

Figure 8:
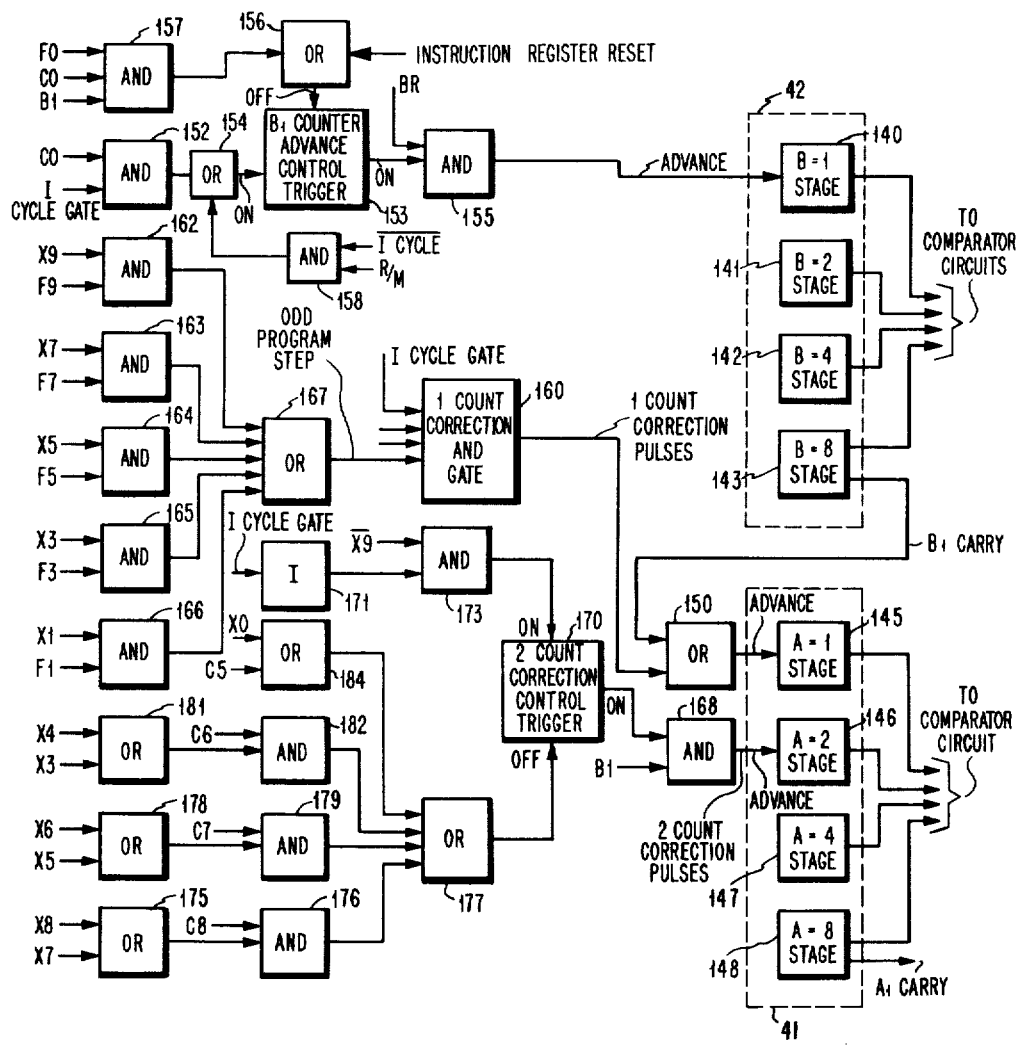
FIG. 8 is a block diagram of count correction circuits employed in the arangement of FIG. 2.

To accomplish these count corrections, the I Cycle Gate signal is used along with the Count Correction circuits in FIG. 8, to change specific stages of the $A_1B_1$ counters 41, 42 and the $A_2B_2$ counters 44, 45 of FIG. 3 so as to place these counters in proper count relationship to the cycling of the drum as quickly as possible after the I Cycle. Referring now to FIG. 8, only the $B_1$ counter and $A_1$ counter 42 and 41 respectively, are shown, although it will be understood that the coupled gating elements are also connected in like fashion to the various stages of the $B_2$ and $A_2$ counters 45 and 44 respectively. The $B_1$ counter 42 is a binary coded decimal counter consisting of four stages, separately identified as the $B=1$, $B=2$, $B=4$ and $B=8$ stages. The output terminals of the various stages 140 through 143 are coupled, as shown in simplified form, to the comparator circuits. The intercouplings between the various stages 140 through 143 have been omitted for clarity, the only input couplings which are shown being the advance signal input to the $B=1$ stage 140, this being the input terminal to which counter advance signals are applied. In like manner, the $A_1$ counter 41 consists of four intercoupled binary coded decimal stages $A=1$, $A=2$, $A=4$ and $A=8$ numbered 145 through 148 respectively. Again, the output terminals of the various stages 145 through 148 are coupled to the comparator circuits and the intercouplings between successive stages are not shown. The $A=1$ stage 145 is advanced by "one count correction" pulses and by $B_1$ carry pulses from the $B_1$ counter 42 which are applied through an OR circuit 150 to the advance input. The $A=2$ stage is independently advanced by "two count correction" pulses applied to its advance input from circuitry which is to be described below.

As was previously described, the $B_1$ counter 42 is advanced during the R Cycle. Because the R Cycle cannot begin until the C6 B0 time following the completion of the I Cycle Gate signal, however, it is necessary for the $B_1$ counter 42 to be corrected for this interval, so as to have a proper units count relationship to the position of the process drum. Five counts are needed, because of the fact that the counter is to be advanced prior to each character position, and because counts are arranged to begin relative to the CE position on the drum. Accordingly, the five character positions which are used are the C0 position of the I Cycle Gate, and the C9, C8, C7 and C6 positions of the next succeeding field. The C0 gate signal which is applied coincidently with the I Cycle Gate signal to an AND gate 152 turns on a $B_1$ counter advance control trigger 153 through an OR gate 154. The BR gate of the C0 character gate and the next four succeeding character gates are then applied through an AND gate 155 to the advance input of the $B=1$ stage 140 of the $B_1$ counter 42, the AND gate 155 being conditioned by the "on" output signal from the $B_1$ counter advance control trigger 153. This correction of the $B_1$ counter 42 is therefore uniform for each operation, because the I Cycle terminates coincidently with a field on the drum, and because the R Cycle begins in each instance a specified number of characters later.

Both the $A_1 B_1$ counter 41, 42 shown in FIG. 8, and the $A_2 B_2$ counter 44, 45, which is not shown in FIG. 8, are corrected in the units stage in the same manner. Each then counts BR pulses in a continuous cycle until the instruction is completed, at which time the instruction register 26 is reset by the instruction register reset signals and the $B_1$ Counter Advance Control trigger 153 is turned off by the same signals applied through an OR gate 156. Where more than one drum cycle is required to complete the instruction, the F0, C0 and B1 gates activate an AND gate 157 which turns off the $B_1$ Counter Advance Control trigger momentarily through the OR gate 156. The count is again initiated by the application of the reference mark pulse to the on input of the $B_1$ Counter Advance Control trigger 153 through the OR gate 154 and an AND gate 158, which is conditioned by the not I Cycle signal.

The correction of the $A_1$ counter 41 proceeds in accordance with a definite program which is determined by the address of the instruction presented by the program counter 25 of FIGS. 2 and 4. The counts presented by both the $A=1$ stage 145 and the $A=2$ stage 146 are corrected in the five character times which are available between C0 of the I Cycle Gate and the C6 character gate of the next succeeding field. If the field occupied by the instruction is odd numbered, a one count correction pulse is first provided. Then a number of two count correction pulses are provided during successive character positions, as determined by the actual field location of the instruction. Referring to the count presented by the unit stage of the program counter as a program step, the various correction counts which are needed, from 1 to 9, may be shown as successively generated during the character gates C0 through C6 for the different odd and even program steps as follows:

|                   | C0 | C9 | C8 | C7 | C6 |
|-------------------|----|----|----|----|----|
| Odd Program Step  | 1  | 3  | 5  | 7  | 9  |
| Even Program Step |    | 2  | 4  | 6  | 8  |

This table signifies that depending upon the program step, as presented by the units stage of the program counter, a count correction is made which proceeds with the successive character positions available until the desired final correction count is reached. If the instruction is contained in the fifth field, for example, so that 50 must be introduced in the count presented by the $A_1 B_1$ counter 41, 42, then a one count correction is provided during the C0 gate, and two successive two count correction pulses are provided during the following C9 and C8 gates respectively. The one count correction is the same, wherever used, so that the operation of these portions of the count correction circuits may be conveniently separated into the one count correction part and the two count correction part.

The one count correction operation centers about a one count correction AND gate 160 which is conditioned during the B1 C0 time of the I Cycle Gate signal by three corresponding input signals. Odd program step signals are provided to the remaining input terminal of the one count correction AND gate 160 from individual ones of a group of AND gates 162 through 166, each of which detects the use in the program counter of a different one of the odd fields in an instruction track. All of this group of AND gates 162—166 are coupled to the same input of the one count correction AND gate 160 through an OR gate 167. Taking a first of the AND gates 162 as an example, the two input signals provided thereto are the X9 terminal from the program counter 25 of FIG. 3 and the F9 field gate line from the timing pulse generator 22 of FIG. 3, the designation "X9" is used to identify the tens and units stage counts presented by the program counter. Because the value of the tens digit is determinative only of the instruction track which is to be used and it is therefore not significant to the count correction process, it is indicated only by an "X." The relationship established by the coincidence of the X9 and F9 signals is that the program counter is addressing field number 9 of a selected track, and that the field is at that time under the magnetic head, so that the I Cycle Gate signal is being provided.

Similarly, the coincidence of the X7 signal from the program drum and the F7 field gate signal activates the next AND gate 163, and so on to the X1 and F1 signals which activate the final AND gate 166 in this group. The signals provided through the OR gate 167 from each of the AND gates 162 through 166 constitute "odd program step" signals which complete the activation of the one count correction AND gate 160, so that the one count correction pulse is provided through the OR gate 150 to advance the A=1 stage 145 of the $A_1$ counter 41. No one count correction pulse is provided in the remaining instances, in which an even numbered field is used on an instruction track.

The two count correction pulses applied to the A=2 stage 146 of the $A_1$ counter 41 are defined by B1 pulses applied through an AND gate 168, which is conditioned by the "on" output terminal of a two count correction control trigger 170. The B1 signals are applied, depending upon the field at which the instruction is located, during selected ones of the C9, C8, C7 and C6 character times following the I Cycle Gate signal. In general terms, the operation may be considered to consist of turning the two count correction control trigger 170 on for a desired number of character times, to let the B1 pulse pass through the AND gate 168 to advance the $A_1$ counter 41 by steps of two.

The two count correction control trigger 170 is turned on upon cessation of the I Cycle Gate signal through application of the I Cycle Gate signal to an inverter 171 which is coupled to one input of an AND gate 173. The remaining input of this AND gate 173 is responsive to the X9 signals from the program counter, and the output terminal of the gate 173 is coupled to the "on" input terminal of the two count correction control trigger 170. If the field in which the instruction is located is the number 9 field, the two count correction control trigger 170 need not be turned on, because only a one count correction is needed. Otherwise, the two count correction control trigger 170 is turned on in each instance upon cessation of the I Cycle Gate signal.

The AND gate 168 which passes the two count correction pulses is closed by turning off the two count correction control trigger 170 at a proper time, as determined by the actual field position of the instruction on the instruction track. The remaining gating elements control the turn-off time. A review of these elements will also provide a review of the various operating conditions.

Where the instruction is contained in field 9, as discussed above, the two count correction is not used. Otherwise, two count correction pulses are generated for each successive pair of field positions, starting with the pair defined by the eighth and seventh fields. The X8 and X7 signals from the program counter are coupled together through an OR gate 175 and applied to an AND gate 176, the remaining input of which is responsive to the C8 character gates. The output terminal of the AND gate 176 is coupled through a four input OR gate 177 to the turn-off input of the two count correction control trigger. During the B1 time of C9 character gate, therefore, a two count correction pulse is passed through the AND gate 168 to advance the A=2 stage 146 of the $A_1$ counter 41, while the C8 character gate is used to shut off the two count correction control trigger 170 before further B1 pulses can generate two count correction pulses.

When the units stage of the program counter provides counts which select the sixth or fifth fields according to the numbering system, the X6 and X5 signals are used in conjunction with the C7 character gate in a series connected OR gate 178 and an AND gate 179 which pass signals through the OR gate 177 to turn off the two count correction control trigger 170. Thus, the B1 pulses provide two count correction pulses through the AND gate 168 during the C9 and C8 times but are blocked off commencing with the C7 character gate. A similar combination is used for the X4 and X3 signals from the program counter, which are applied through an OR gate 181 and along with C6 character gates to an AND gate 182 for application through the OR circuit 177 to the off input of the two count correction control trigger 170. Here three two count correction pulses are applied to the A=2 stage 146, as is need to set the $A_1$ counter 41 in the proper count relationship.

The remaining fields which are available for use on the instruction track are those numbered 2, 1 and 0. The use of the number 2 or number 1 field on the instruction track requires four correction pulses, and these four pulses are provided during the B1 time of the successive C9 through C6 character gates, and stopped by application of the C5 character pulse through the remaining OR gate 184 which is coupled to the OR gate 177. Where the program counter selects field number 0, the X0 signal applied to the OR gate 184 turns off the two count correction control trigger 170 immediately, because then the R and W Cycles must necessarily use the succeeding cycle of rotation of the process drum.

The above completes the description of the operation of the principal functional units of the system, as illustrated in the block diagram of FIG. 2. While this arrangement is complete, and will function as indicated in all contingencies, an additional example may be given to illustrate a complete data transfer operation. The example chosen is one in which, referring to FIGS. 9 and 10, the length and placement of the data on the data storage tracks is so related to the instruction that the I, R and W Cycles may be completed in a single revolution of the drum.

Figure 9:
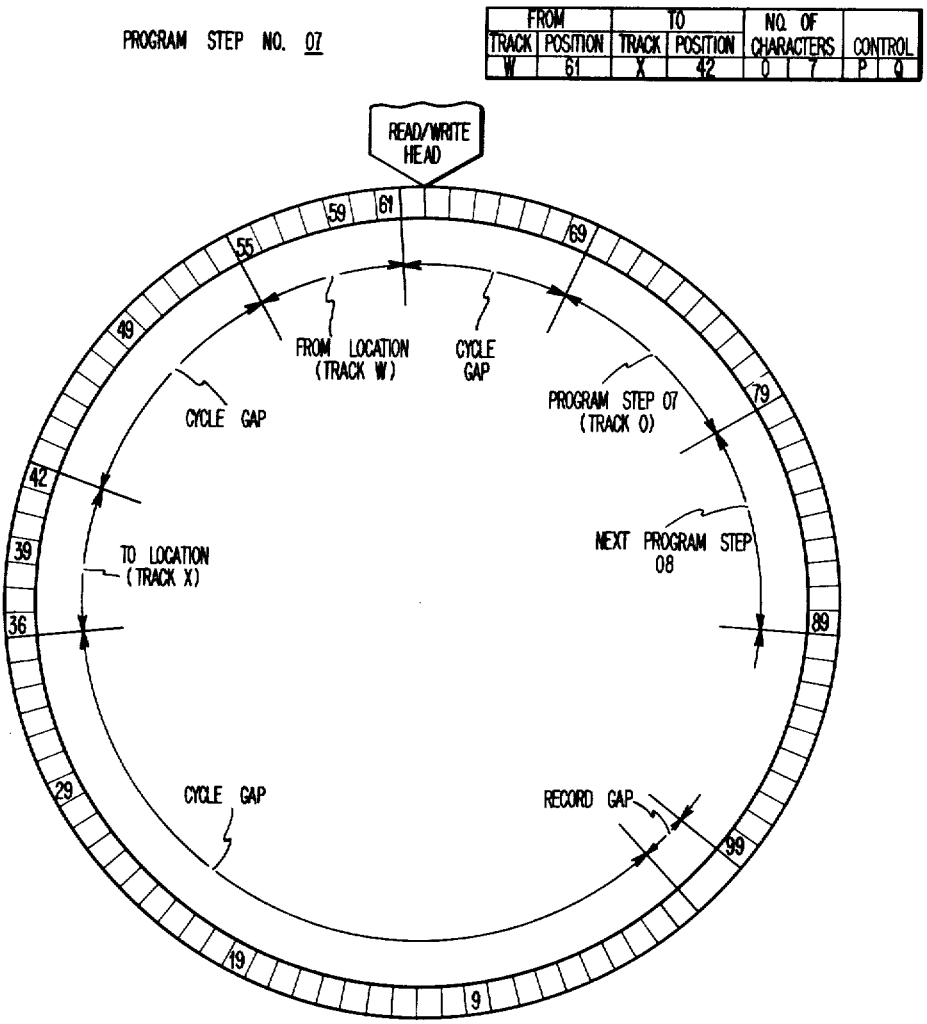
FIG. 9 is a simplified representation of data transfer operations on the process drum of FIG. 3, showing relationships useful in explaining the system.

Referring specifically to FIG. 9, in the example given, seven characters are to be transferred in accordance with program step 07 from an address beginning with character position 61 on track W (an arbitrary designation) to an address beginning with character position 42 on data storage track X (also an arbitrary designation). The control characters P and Q are not of pertinence to this data transfer, and have merely been indicated for completeness. The numbering of the peripheral character positions on the process drum 21 is merely intended to show the relative placement of the character positions, between the different tracks including the instruction and storage tracks, with relation to each other and to the record gap. FIG. 9 therefore provides a graphic illustration of the manner in which the subsequences of the data transfer operation are carried out.

The subsequence following the record gap selects the proper field and track for the location of an instruction. Here the program step 07 (track 0 and field 7) is to be used. Therefore, during the I Cycle running from character positions 79 to 70 inclusive, the instructions contained at these character positions on the selected instruction track are read out and entered into the instruction register. Subsequent to the entry of this instruction, what may be called a "Cycle Gap" is provided which includes at least the C6 character position of the next succeeding field. Where at least this amount of spacing is not available, the system begins its next cycle of operation subsequent to the passage of the record gap at the read/write heads, so that another full drum 21 cycle is employed. Where, as in the present example however, the FROM location begins on a data track at a character position which is more than four characters behind the instruction location, relative to the magnetic heads, the data transfer from the process drum 21 to the core buffer storage is accomplished during the same revolution of the process drum 21. There then follows another Cycle Gap, which need not conform to a specific number of character positions but should take a finite time so as to allow switching to be effected. Because, in the present example the FROM location begins at character position 61 and finishes at the end of character position 55, while the TO location begins at character position 42 and finishes after the end of the character position 36, there is more than adequate spacing and the W Cycle can be undertaken and completed in the same revolution of the process drum 21. The remainder of the W Cycle, subsequent to the end of character position 36 is a Cycle Gap and is not here employed.

Where the relative positions of the instruction, the FROM location and the TO location are not in order, or overlap, a single revolution of the process drum 21 is not sufficient to complete the I, R and W Cycles. Less than three full revolutions may, however, be sufficient if any two of the placements and spacings are proper. Thus both the I and R Cycles may be completed within a single revolution and the W Cycle completed in the next revolution, or the R and W Cycles may be completed in a single revolution with the I Cycle having required a full previous revolution. Likewise, a W Cycle of one instruction may be shared with the I Cycle of the next instruction.

Figure 10:
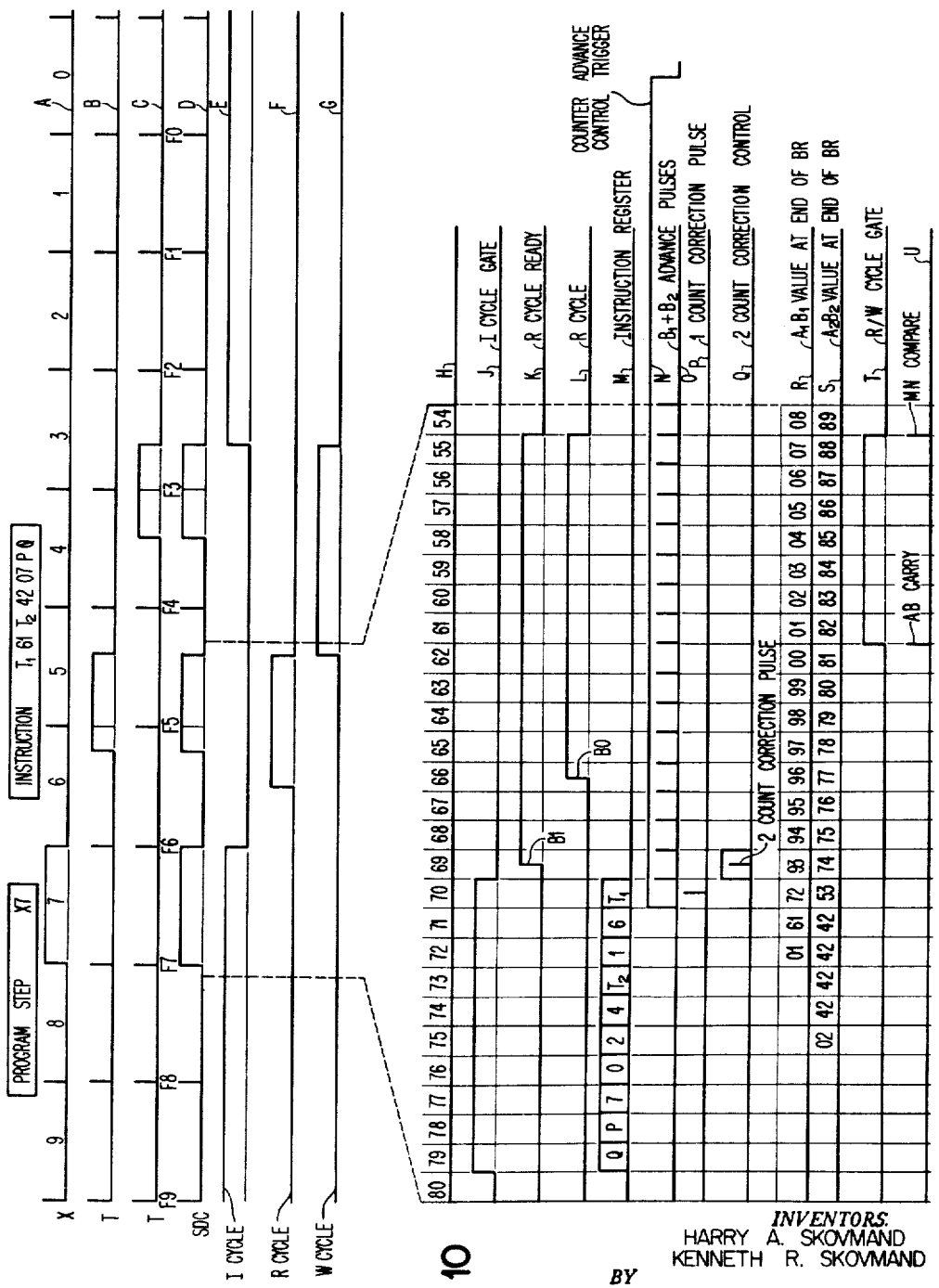
FIG. 10 is a timing diagram, showing the variations with time of various signals occurring during a typical sequence of operations of the circuits of FIG. 2.

Some further understanding of the coherent and orderly progression of these subsequences in a Shared Drum Cycle mode of operation may be understood by reference to the timing waveforms and representative waveforms illustrated in FIG. 10. The timing diagrams which are there included show the waveform variations which occur at the designated points within the system. The example chosen is the same as that used above with respect to FIG. 9. Waveforms A, B and C represent the relative placement and duration of the instruction field, the data in the FROM location and the data in the TO location for the example. Waveform D shows these combined waveforms relative to the fields of the drum, in the Shared Drum Cycle mode, and illustrates in linear form the relative placements previously discussed with respect to FIG. 9. Waveforms E, F and G represent the I Cycle, R Cycle and W Cycle signals respectively, generated as described in conjunction with FIG. 7.

The remaining waveforms and numerical designations on lines H through U, are taken on an expanded scale relative to waveform D, specifically the part between the beginning of character position 80 and the end of character position 54. On line H, the successive character positions have been numerically designated. The I Cycle Gate signal, generated as described above in conjunction with FIGS. 7 and 3, is shown on waveform J as being coextensive with field No. 7, that is, beginning with the start of character position 79 and finishing with the end of character position 70. The R Cycle Ready signal shown in waveform K is commenced with the B1 gate which next follows the termination of the I Cycle Gate signal. The R Cycle signal, however, commences at a later time beginning with the C6 character, here character position 66, and the B0 bit gate which next follows the end of the I Cycle Gate signal. Both the R Cycle Ready signal and the R Cycle signal terminate, along with the R/W Cycle Gate signal, when the information has been transferred from the desired storage track on the magnetic drum, as indicated by the application of the MN Compare signal at the end of character position 55.

As shown on line M, the entry into the instruction register begins in reverse order, starting with the Q character and ending with the $T_1$ character during the I Cyce Gate time. The time interval during which the $T_1$ character of the instruction is transferred is used to turn on the counter advance control trigger (153 in FIG. 8) at C0 time of the I Cycle Gate signal. The advance pulses which are applied to the B=1 stage of the $B_1$ counter 42 or the $B_2$ counter 45 are supplied by the BR pulses which immediately precede each successive character position, as illustrated in waveform O. The counters effectively continue the count until the remainder of the revolution of the process drum.

The counters must, however, first be adjusted to counts which place them in the proper relationship to the rotational position of the process drum. These adjustments must account for the position of the instruction relative to the process drum. The remaining waveforms and representations, shown on lines P through U, graphically illustrate the count correction which is specifically described with relation to FIG. 8.

Because, in the selected example, the instruction is located in field No. 7, a correction of 3 in the tens stage of each of the $A_1$ $B_1$ and $A_2$ $B_2$ counters is required. Accordingly, as shown on waveform P, the one count correction pulse is generated during the provision of the B1 gate in the $T_1$ character time. The two count correction control trigger 170 (FIG. 8) is turned on at the beginning of character position 69 and off at the end of the same character position to pass through a single B1 pulse so as to effect the desired two count correction which completes the correction of the tens stages. In the meantime, the BR pulses which are passed through beginning with character position 70 place the unit stages of these counters in the proper count relationship to the rotational position of the process drum.

The exact transition of the counts in the $A_1$ $B_1$ and $A_2$ $B_2$ counters may be seen by references to lines R and S in FIG. 1. During character position 75, the units count of "2" is set into the $B_2$ counter, while during character position 74 the tens count of "4" is set into the $A_2$ counter. Similarly, the units stage of the $A_1$ $B_1$ counter is set to a "1" value during character position 72 and the tens stage is set to a "6" during the succeeding character position. These counts remain the same until the beginning of the counter advance control trigger signal provided when that trigger is on. Then, the units stage of each counter is advanced by 1 by the advance pulses (waveform O), and the tens stages are advanced by 10 by the various count correction pulses. Here, the one count correction advances each counter by 10, and the succeeding two count corrections advance each counter by 20, while two successive advances are concurrently made of the units stages. At character position 68, therefore, the correction has been completed and the counts are in the proper count relationship. The value presented by the $A_1$ $B_1$ counter, illustrated on line R, which determines the transfer from a given location on the process drum, provides a carry signal from the $A_1$ $B_1$ counter when the 00 count has been set in, and this carry initiates the R/W Cycle Gate signal for the R Cycle. When the $A_1$ $B_1$ counter indicates the transfer of the desired number of characters, here seven characters, the MN Compare signal (also indicated in waveform U) is provided to terminate the R/W Cycle Gate signal, as shown on waveform T.

The above constitutes a complete description, therefore, of the timing relationships of the different pulses in a typical sequence involved in the Shared Drum Cycle mode of operation. The W Cycle, which follows after the R Cycle, operates in a similar manner and need not be described. No further count correction is necessary. At the end of W Cycle, the instruction register reset signal clears the instruction register and turns off the $B_1$ counter advance control trigger 153. When a single drum revolution cannot be shared by more than one of the I, R and W Cycles, the system operation proceeds automatically, with the $A_1$, $B_1$ and $A_2$, $B_2$ counters in proper count relationship to the rotational position of the drum.

While there have been described above and illustrated in the drawings various forms of signal processing systems for operating with a cyclic recording medium to effect data transfer operations in a minimum time, it will be appreciated that the invention is not limited thereto. Accordingly, the invention should be understood to include all modifications, variations and alternative forms falling within the scope of the appended claims.

What is claimed is:

1. A data processing system comprising
a cyclic recording device in which the data to be transferred is maintained,
a settable counter means coupled to said recording device for supervising data transfer operations,
means controlling said settable counter means and operatively coupled thereto to establish desired count relationships to the cyclic recording device, and
means coupled to said settable counter means for changing the desired count relationship of the settable counter means relative to the cyclic recording device depending upon the time of operation of said controlling means.

2. A data processing system in accordance with claim 1 in which said settable counter changing means operates in synchronism with the cycling of the recording device.

3. A data transfer system comprising
a cyclic recording device in which data to be transferred is maintained,
settable counting means coupled to said recording device for supervising data transfer operations,
means connected to said counting means to set a selected count therein in a given time interval related to a cycle of operation of the recording device, and
means coupled to said counting means to establish a new count in the counting means dependent upon the time during said interval that said selected count is entered into said counting means.

4. A data transfer system including the combination of
a cyclic recording device in which data to be transferred is maintained,
settable counting means coupled to said device for addressing the cyclic recording device,
means connected to said counting means to set a count therein selected in accordance with an instruction and at a known time interval relative to the cyclic operation of the recording device,
and means coupled to said counting means to change the count thereof by an amount determined by the relationship of the known time interval to the cyclic operation of the recording device, in a time interval immediately following the known time interval.

5. A data transfer system comprising
a cyclic recording device in which data to be transferred is maintained,
settable counting means coupled to said device and advanceable with the cyclic recording device for addressing selected locations in the cyclic recording device,
means connected to said counting means for setting selected counts therein during selected time intervals relative to the cycles of operation of the recording device, and
means coupled to the settable counting means for correcting the counts therein depending upon the time of occurrence of the selected time intervals to establish a selected counting relationship to the cycles of operation of the cyclic recording device.

6. A data transfer system comprising
a cyclic recording device containing instruction data and stored data,
settable counting means coupled to said device and advanceable with the cyclic recording device for addressing selected locations in the cyclic recording device,
means coupled to said device for setting selected counts into the settable counting means at known time intervals relative to the cycling of the recording device, and
means coupled to the settable counting means for correcting the counts set therein by amounts determined by the relation of the known time interval to the cycling of the recording device.

7. A data transfer system including a cyclic recording device,
counters coupled to said device and synchronized therewith for addressing the recording device,
means coupled to said counters for setting the counters at variable time intervals related to the cycles of operation of the cyclic recording device, and
means connected to the counters for advancing the counters in synchronism with the cyclic recording device and for correcting the count therein by a value determined by the time interval, relative to the cycling of the device, in which the counters are set.

8. A data transfer system including
a cyclic recording device for storing data at successive character positions and for storing instructions at successive field positions,
counters for addressing the recording device, said counters being coupled to said device to be advanced with the successive character positions on the recording device, means coupled to said device responsive to individual ones of the stored instructions for setting the counters during time intervals determined by the field position from which the instruction was taken, means connected to said counters responsive to the completion of setting the counters for defining a count correction interval of selected duration, and means connected to said counter for changing the setting of the counters during the count correction interval by amounts corresponding to the field position from which the instruction was taken.

9. In a data processing system utilizing a cyclic recording device and in which counter means for addressing the cyclic recording device are set by instruction signals at a selected time interval relative to the operative cycle of the recording device, the combination including gating means connected to said counter means for establishing a count correction cycle for the counter means in response to the time relationship of the setting of the counter means to the cyclic operation of the recording device, and means coupled to the gating means for applying a series of correction pulses to the counter means to advance the counter means during said correcting cycle to a selected count relationship relative to the cycle of operation of the recording device.

10. In combination with a data processing system utilizing a cyclic recording device for the retention of instructions and data, in which the instructions are recorded at selected positions relative to the cycling of the recording device, and in which timing signals are provided to define the cycling relationship, counter means coupled to said device supervising data transfer operations, means coupled to said counter means for initiating a count correction cycle in response to the position on the recording device at which a selected instruction is located, and means coupled to said counter means for supplying a selected number of timing pulses to the counter means to correct the count thereof during the count correction cycle, said selected number of pulses being dependent on the position of the instruction relative to the cycling of the recording device.

11. In a data transfer system utilizing a cyclic recording device in which instructions are maintained in different count relationships to the cycling of the recording device, and in which timing gate signals are derived to define successive field, character and digit positions, the combination of settable counter means coupled to said device for addressing the cyclic recording device, means coupled between said device and said counter for selecting an instruction, means coupled to said counter means responsive to selected instructions on the cyclic recording device for setting the counter means to values specified by said selected instruction, means connected to said setting means for detecting the completion of the setting of the counter means, means coupled to said instruction selecting means for manifesting the relationship of the position of the instruction to the cycling of the recording device, and means coupled to said counter for defining a count correction cycle initiating subsequent to the setting of the counter means and terminating at a time determined by the means for manifesting the relationship of the position of the instruction to the cycling of the recording, said count correction cycle defining means including gating means coupled to the counter means to enable selected timing pulses to advance the counter means during the count correction cycle to a selected relationship relative to the cycling of the recording device.

12. A data processing system including the combination of a magnetic drum having instruction tracks and storage tracks, the instruction tracks being divided into fields, a counter coupled to said device for addressing the storage tracks on the magnetic drum, means connected to the counter responsive to a selected field on the instruction track for entering selected counts into the counter, and means connected to said counter for advancing the counter by counts selected in accordance with the position of the field from which the instruction was taken.

13. A data processing system for accomplishing data transfer operations including the combination of a magnetic drum having instruction tracks and data storage tracks, the instruction tracks being divided into fields and each of the instruction and storage tracks including regularly spaced character and digit positions, binary counter means coupled to said data tracks for controlling data transfer operations to and from said data storage tracks on the magnetic drum, means coupled to said drum to select an instruction field, means coupled to said drum and said counter means for setting the binary counter means to a selected count in accordance with a selected instruction, and means for applying count correction pulses to the counter means in accordance with the position of the field from which the instruction was selected and the termination of the setting of the binary counter means whereby the counter means is placed in a selected count relationship to the cycling of the magnetic drum.

14. In a data processing system in which data transfer operations are to be carried out and in which data is transferred from one track on a cyclic recording device to another track under control of an instruction positioned at a given cycling relationship to the recording device, the combination of binary counter means coupled to said device having a plurality of stages for addressing the data tracks on the recording device, means coupled to said counter means for setting the counter means in response to selected instructions on the recording device, means connected to said setting means for initiating a count correction cycle in response to the setting of the counter means, means connected to said counter means for terminating the count correction cycle in response to the relationship of the instruction to the cycling of the recording device, and means coupled to said counter means for applying correction pulses to the stages of the counter means in a regular sequence during the count correction cycle in response to the cycling of the recording device.

15. The invention as set forth in claim 14 above, wherein the means for applying count correction pulses in a regular sequence includes means applying a one count correction pulse to the first binary stage of the counter means and thereafter two count correction pulses to the second binary stage of the counter means.

16. A data transfer system including the combination of a magnetic drum in which instructions are recorded in fields and instruction tracks thereon, and in which data is stored in data storage tracks thereon beginning with a reference mark on the drum, program counter means coupled to said drum for addressing selected instruction fields on the magnetic drum, binary coded decimal address counter means coupled to said drum for addressing the data storage tracks on the magnetic drum to selected character positions, the counter means being set to a count to provide a carry at the initiation of a data transfer and thereafter indictae the number of characters being transferred when the counter means is advanced from the reference mark, comparator means coupled to the address counter means for indicating the transfer of a selected number of characters, gating means coupled to said drum for providing controlled operative steps during a data transfer operation in response to the cycling of the magnetic drum, the setting of the counter means and the operation of the comparator means, and count correction means coupled to said counter means for advancing the counter means to a count relationship with respect to the cycling of the magnetic drum in which the counter means provides a carry at the desired character position although advanced from a time subsequent to the reference mark in response to the instruction field from which an instruction is taken and to the termination of the setting of the counter means.

17. A data transfer system including the combination of a magnetic drum having instruction and data storage tracks, each of the tracks being divided into regularly spaced character and digit positions, the instructions being provided at character positions which are grouped in fields, an address counter coupled to said drum for addressing the magnetic drum to provide data beginning with selected character positions, the address counter being settable to provide a carry at the initiation of the data to be transferred, comparator means coupled to the counter for indicating the completion of the transfer of a selected number of characters, means coupled to said counter for setting the counter with selected counts in response to the instruction from the selected field on the magnetic drum, means coupled to said counter for initiating a count correction cycle in response to the completion of the setting of the counter, means coupled to the counter for advancing the counter during the count correction cycle in a selected progression, and means coupled to the counter for terminating the advancing of the counter in accordance with the timing relationship of the instruction field from which the instruction was taken to the cycling of the magnetic drum, so that the counter is set in a corrected count relationship so as to provide a carry in proper relationship to the desired character positions on the magnetic drum.

References Cited in the file of this patent

UNITED STATES PATENTS 2,916,210    Selmer _____ Dec. 8, 1959

UNITED STATES PATENT OFFICE
CERTIFICATE OF CORRECTION

Patent No. 3,069,659                      December 18, 1962

Harry A. Skovmand et al.

It is hereby certified that error appears in the above numbered patnt requiring correction and that the said Letters Patent should read as orrected below.

Column 1, line 63, for "John H. Haanstra et al." read -- John W. Haanstra et al. --; column 2, line 24, for "systems" read -- system --; column 5, line 34, for "6" read -- 26 --; column 6, line 9, for "not" read -- now --; column 7, line 72, after "FIG. 6," strike out "as"; column 16, line 17, for "X9" read -- $\bar{X}9$ --; column 19, line 9, for "FIG. 1" read -- FIG. 10 --.

Signed and sealed this 3rd day of September 1963.

(SEAL)
Attest:

JEST W. SWIDER                                    DAVID L. LADD
esting Officer                                       Commissioner of Patents